July 25, 1961

C. PALMER 2,993,521

EGG CUTTER

Filed Aug. 5, 1959

INVENTOR
CHESTER PALMER

BY
*Wright & Wright*
ATTORNEYS

United States Patent Office 2,993,521
Patented July 25, 1961

2,993,521
EGG CUTTER
Chester Palmer, Box 63, Elkhorn, Wis.
Filed Aug. 5, 1959, Ser. No. 831,884
6 Claims. (Cl. 146—2)

This invention appertains to kitchen appliances and more particularly to a novel machine for scoring the shells of eggs entirely around the outer surface thereof, whereby the eggs thereafter can be quickly and cleanly broken by a person without danger of shell fragments being mixed with the edible portions of the eggs.

One of the primary objects of my invention is to provide a small, compact machine which will effectively hold fragile eggs, without danger of the breaking thereof, properly centered relative to and against a rotary scoring or cutting blade, with means for rotating an egg around the blade, so that the egg will be effectively scored, grooved or cut along a thin line around its entire surface, whereby the eggs can be cleanly broken along such lines.

Another salient object of my invention is the provision of a novel spring tensioned device for holding the egg centered against the scoring blade and on pairs of rollers which support the eggs, a certain pair of rollers being driven from the rotary blade shaft for turning the egg relative to the blade, the spring tension device being so arranged and constructed as to permit the quick placing and removing of an egg on and off the machine.

A further important object of my invention is the provision of means for permitting a quick and convenient adjustment of one pair of the supporting rollers for the eggs, whereby eggs of different sizes and shapes can be expeditiously handled by the machine.

A still further important object of my invention is to provide an egg cutter of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed, and illustrated in the accompanying drawing, in which drawing, FIGURE 1 is a vertical sectional view through my improved egg cutter taken on the line 1—1 of FIGURE 2, looking in the direction of the arrows, the view illustrating the novel support for the egg and the novel means for holding the egg against the support and against the rotary scoring blade;

Referring to the drawing in detail, wherein similar reference characters designate corresponding parts throughout the several views, the letter M generally indicates my machine for scoring or cutting an egg E.

Figure 1:
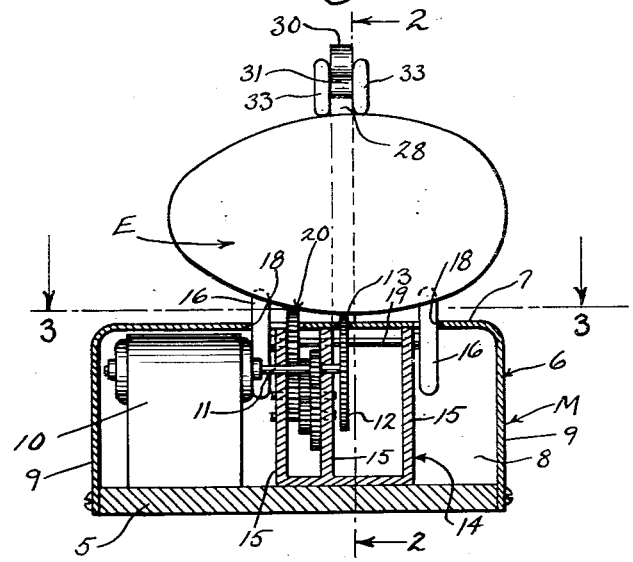

The machine M comprises a flat supporting base 5 on which is mounted various elements of the machine and these elements are partially enclosed by a casing or housing 6 detachably connected to the base. The casing or housing 6 is preferably of an ornamental character and treated to present a pleasing appearance to the eye. As illustrated, the casing or housing 6 includes a flat top wall 7, and depending side walls 8 and end walls 9.

Figure 2:
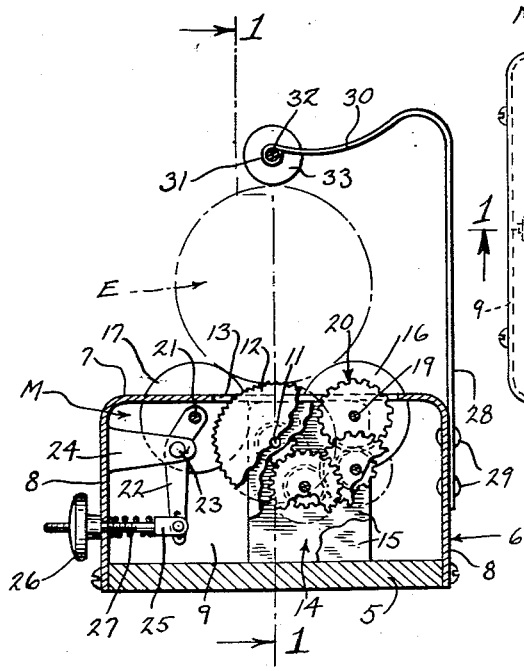
FIGURE 2 is a vertical sectional view taken at right angles to FIGURE 1, and on the line 2—2 of FIGURE 1, looking in the direction of the arrows, the view illustrating the adjustment of one pair of the supporting rollers and the means for power driving the other pair of supporting rollers at a reduced speed from the shaft of the scoring knife.

Secured to the base 5 at one side of its transverse center is a small electric motor 10 of the high speed type. The motor 10 has its armature shaft 11 extended outwardly toward the transverse center of the machine and this shaft has keyed or otherwise secured thereto a toothed scoring or cutting blade 12. This blade is of the circular type, as is best shown in FIGURE 2. As the toothed scoring or cutting blade 12 is connected directly with the armature 11, the same is driven at a high rate of speed. This blade protrudes above the top wall 7 of the casing or housing 6 and this top wall is slotted, as at 13, to receive the blade.

Also rigidly secured to the base 5 is a supporting bracket 14, the arms 15 of which are provided with bearings for various shafts, as will now be set forth. It can be seen from FIGURE 1, that certain of the arms 15 rotatably support the armature shaft 11.

The egg E to be scored or cut is supported in proper position on each side of the scoring blade 12 by a pair of rollers 16 and a pair of rollers 17. The top wall 7 of the casing or housing is slotted, as at 18, so as to permit these rollers to protrude through the casing for effectively supporting the egg. The rollers 16 are keyed or otherwise fastened to a supporting shaft 19, which is journaled in the arms 15 of the bracket 14. This shaft 19 is power driven and driven at a decidedly reduced speed from the armature shaft 11. This is accomplished by connecting the shaft 19 with the armature shaft 11 by a train of gearing 20. The shafts for the various gears of the train of gears are rotatably supported by certain arms 15 of the bracket 14.

Figure 3:
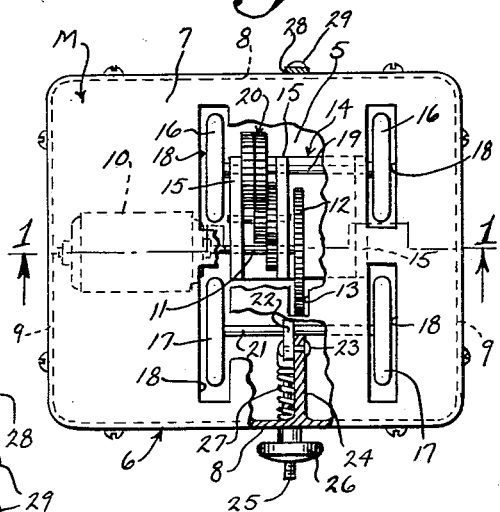
FIGURE 3 is a horizontal sectional view taken on the line 3—3 of FIGURE 1, looking in the direction of the arrows, the view illustrating more particularly the arrangement of the pairs of supporting rollers for an egg.

The pair of rollers 17 are rotatably mounted on a supporting shaft 21 and this shaft is arranged in spaced parallel relation to the shaft 19 and normally in the same horizontal plane therewith. However, the pair of rollers 17 are adjustable so that eggs of different sizes and shapes can be effectively accommodated in the machine. Hence, the shaft 21 is carried by a bell crank shaped lever 22. This lever is rockably mounted intermediate its ends on a pivot 23 carried by a bracket arm 24. This bracket arm can be supported from the casing or housing 6, as shown in FIGURES 2 and 3. The lower end of the lever 22, has pivotally and slidably connected thereto an adjusting rod 25 which slidably extends through an opening in one side wall 8. A thumb nut 26 is threaded on the rod 25 and bears against the outer face of this wall 8. An expansion spring 27 is coiled about the rod and bears against the inner face of the wall 8 and against the rod so as to normally urge the rod inwardly in one direction and this movement is of course, restrained by the thumb nut 26. By turning the nut 26, the bell crank 22 can be rocked and thus bring the pair of rollers 17 nearer or farther from the shaft 19.

The egg E to be cut is placed longitudinally of the machine on the rollers 16 and 17 and the rollers 16 lie on one side of the longitudinal center of the egg and the rollers 17 lie on the other side of the longitudinal center of the egg. Hence, the egg is effectively supported by the pairs of rollers with the egg resting on the scoring or cutting blade 12.

In order to hold the egg being cut down on the rollers 16 and 18 and against the scoring or cutting blade 12 I provide a leaf spring 28. This leaf spring is riveted, or otherwise fastened to the casing 6, as at 29. The upper end of the leaf spring is provided with a laterally extending resilient arm 30, which extends over the shell or casing directly above the scoring or cutting blade 12, and this arm is tensioned so as to normally press downwardly.

The end of the arm which is directly over the scoring or cutting blade 12 is rolled as at 31 to receive a shaft 32 on which is rotatably mounted holding rollers 33.

Obviously, by lifting the arm 30 an egg can be quickly and conveniently placed on or removed from the rollers 16 and 17 and while the egg is being cut the rollers 33 bear down with a desired pressure on the egg and hold the egg against the cutting blade and supporting rollers 16 and 17. As the rollers 17 are power driven, the same will turn the egg at a relatively low rate of speed and thus give the blade, which is rotating at a high rate of speed, an opportunity to effectively score or cut the egg around its entire periphery on a thin line. With the scoring and cutting of the egg shell, the egg can be lifted from the machine and then thereafter cleanly broken.

The motor can be driven from any suitable source of electrical energy as may be preferred by the purchaser.

Changes in details may be made without departing from the spirit or the scope of this invention, but what is claimed as new is:

1. A device for facilitating the opening of eggs comprising a base, two pairs of spaced egg supporting rollers carried by the base engaging the periphery of an egg placed thereon, a power driven egg cutting disc rotatably carried by the base and disposed between the pairs of rollers and engaging an egg placed on the rollers, power means rotating at least one pair of the rollers, and resilient egg holding means carried by the base disposed above the rollers and cutting disc and normally urged toward the rollers and cutting disc and an egg placed on the rollers.

2. A device for opening eggs as defined in claim 1, and said last named means being flexible and movable against its inherent resiliency away from the rollers and cutting disc and an egg on said rollers.

3. A device for opening eggs as defined in claim 1, and said last named means including a leaf spring secured to the base having a resilient arm extending over the base directly above the cutting disc and normally urged downward by its inherent resiliency toward the disc, and egg engaging rollers carried by the terminal of the arm.

4. A device for scoring the shell of an egg around the entire periphery thereof comprising a base, an electric drive motor on the base having an armature shaft, a scoring and cutting disc for the shell of the egg driven from said shaft, pairs of rollers disposed on each side of the disc for supporting an egg with the center portion of the egg against the disc, speed reducing means operatively connecting one pair of rollers with the armature shaft, and means resiliently holding the egg down on the rollers and against the disc.

5. A device for opening eggs as defined in claim 4 and the other pair of rollers being adjustable toward and away from the first mentioned pair of rollers.

6. A household appliance for facilitating the opening of eggs comprising a base, a housing carried by the base, an electric motor in said housing and carried by said base having an armature shaft extending toward the center of the base, a scoring and cutting disc rotated by said armature shaft and extending through a slot in the upper end of said housing, a pair of rotatable rollers carried by the base plate and disposed at one side of the scoring disc, means for rotating the rollers at a reduced rate of speed by a train of gearing from the armature shaft, a second pair of rollers disposed on the other side of the disc from the first pair of rollers carried by the housing, said rollers being adapted to rotatably support an egg with the center portion of the egg resting against the disc, means for adjusting the second pair of rollers toward and away from the first pair of rollers and resilient egg holding means carried by the housing disposed above the rollers and the cutting disc and normally urged toward said rollers and cutting disc, the first set of rollers turning the egg around the disc.

References Cited in the file of this patent

UNITED STATES PATENTS

| | | |
|---|---|---|
| 2,291,395 | Levey | July 28, 1942 |
| 2,443,188 | Hodson | June 15, 1948 |
| 2,771,662 | Ziska | Nov. 27, 1956 |